United States Patent
Igarashi

(10) Patent No.: US 11,763,675 B2
(45) Date of Patent: Sep. 19, 2023

(54) INFORMATION PROCESSING APPARATUS AND INFORMATION PROCESSING METHOD

(71) Applicant: SONY SEMICONDUCTOR SOLUTIONS CORPORATION, Kanagawa (JP)

(72) Inventor: Shinji Igarashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 227 days.

(21) Appl. No.: 17/309,606

(22) PCT Filed: Dec. 5, 2019

(86) PCT No.: PCT/JP2019/047537
§ 371 (c)(1),
(2) Date: Jun. 9, 2021

(87) PCT Pub. No.: WO2020/129656
PCT Pub. Date: Jun. 25, 2020

(65) Prior Publication Data
US 2022/0020272 A1 Jan. 20, 2022

(30) Foreign Application Priority Data
Dec. 18, 2018 (JP) ................. 2018-236535

(51) Int. Cl.
*G08G 1/16* (2006.01)
*G06V 20/58* (2022.01)
(Continued)

(52) U.S. Cl.
CPC .............. *G08G 1/16* (2013.01); *G01S 13/865* (2013.01); *G01S 13/867* (2013.01); *G01S 13/931* (2013.01); *G06V 20/58* (2022.01)

(58) Field of Classification Search
CPC ....... G08G 1/16; G01S 13/865; G01S 13/867; G01S 13/931; G06V 20/58
See application file for complete search history.

(56) References Cited

U.S. PATENT DOCUMENTS

2009/0027180 A1   1/2009   Shibata et al.
2017/0162056 A1   6/2017   Feyerabend et al.

FOREIGN PATENT DOCUMENTS

| CN | 105358397 A | 2/2016 |
| CN | 106949927 A | 7/2017 |

(Continued)

OTHER PUBLICATIONS

International Search Report and Written Opinion of PCT Application No. PCT/JP2019/047537, dated Mar. 10, 2020, 11 pages of ISRWO.

*Primary Examiner* — Nabil H Syed
*Assistant Examiner* — Cal J Eustaquio
(74) *Attorney, Agent, or Firm* — CHIP LAW GROUP

(57) ABSTRACT

The present disclosure relates to an information processing apparatus, an information processing method, and a program that make it possible to perform an appropriate collision determination with respect to an obstacle on an inclined road. A result of an object recognition performed on the basis of an image captured by a camera, a result of an object recognition performed on the basis of a result of detection performed by a millimeter-wave radar, and a result of an object recognition performed on the basis of a result of detection performed by LiDAR are respectively detected; a result of the object recognition is selected depending on the environment around a vehicle; and whether there is a possibility of colliding with the object is determined on the basis of the selected result of the object recognition. The present disclosure is applicable to a vehicle-mounted system.

14 Claims, 9 Drawing Sheets

(51) Int. Cl.
    *G01S 13/86*     (2006.01)
    *G01S 13/931*     (2020.01)

(56) References Cited

FOREIGN PATENT DOCUMENTS

| | | |
|---|---|---|
| DE | 102015224192 A1 | 6/2017 |
| EP | 2023158 A2 | 2/2009 |
| JP | 2003-065740 A | 3/2003 |
| JP | 2009-031053 A | 2/2009 |
| JP | 2009-090840 A | 4/2009 |
| JP | 2010-091386 A | 4/2010 |
| JP | 2012-088217 A | 5/2012 |
| JP | 2017-100716 A | 6/2017 |
| JP | 2017-202828 A | 11/2017 |
| KR | 10-2015-0127745 A | 11/2015 |
| WO | 2014/179109 A1 | 11/2014 |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/047537 filed on Dec. 5, 2019, which claims priority benefit of Japanese Patent Application No. JP 2018-236535 filed in the Japan Patent Office on Dec. 18, 2018. Each of the above-referenced applications is hereby incorporated herein by reference in its entirety.

TECHNICAL FIELD

The present disclosure relates to an information processing apparatus, an information processing method, and a program, and in particular, to an information processing apparatus, an information processing method, and a program that make it possible to perform an appropriate collision determination with respect to an obstacle on an inclined road.

BACKGROUND ART

In an advanced driver-assistance system (ADAS), such as adaptive cruise control (ACC) and pre-crash safety (PCS), that is intended to improve the convenience and the safety, there is a need to determine whether a vehicle can travel after the presence or absence of an obstacle is confirmed, in order to prevent a malfunction in system.

Especially in the PCS, it may be falsely determined that there is a possibility of collision with respect to a maintenance hole or a grating on an inclined road surface, and this may result in sudden braking.

Thus, there is a need to perform a collision determination after recognizing an inclination on a road surface.

A technology used to estimate, using a camera, an inclination on the basis of a change in the vertical position of a tail-ramp portion of a preceding vehicle, has been proposed as a technology used to recognize an inclination (refer to Patent Literature 1).

CITATION LIST

Patent Literature

Patent Literature 1: Japanese Patent Application Laid-open No. 2012-088217

DISCLOSURE OF INVENTION

Technical Problem

However, due to the use of a camera, the technology of Patent Literature 1 may be affected by a change in an environment in which an image is captured, for example, at night or during rough weather. Thus, the accuracy in recognizing a preceding vehicle may be reduced, and this may result in a false determination.

Further, an inclination will not be successfully estimated when there exists no preceding vehicle, since there is a need to detect a change in the vertical position of a tail-lamp portion of a preceding vehicle.

The present disclosure has been achieved in view of the circumstances described above, and, in particular, the present disclosure is intended to perform an appropriate collision determination with respect to an obstacle on an inclined road without being affected by the environment or by the presence or absence of a preceding vehicle.

Solution to Problem

An information processing apparatus according to an aspect of the present disclosure is an information processing apparatus that includes an objection recognition section that recognizes an object situated ahead of a vehicle using a plurality of recognition methods, and outputs results of the object recognitions respectively performed using the plurality of recognition methods; and a collision determination section that selects the result of the object recognition depending on an environment around the vehicle from the results of the object recognitions respectively performed using the plurality of recognition methods, and determines whether there is a possibility of colliding with the object, on the basis of the selected result of the object recognition.

An information processing method and a program according to the aspect of the present disclosure correspond to the information processing apparatus.

In the aspect of the present disclosure, an object situated ahead of a vehicle is recognized using a plurality of recognition methods; results of the object recognitions respectively performed using the plurality of recognition methods are output; the result of the object recognition is selected depending on an environment around the vehicle from the results of the object recognitions respectively performed using the plurality of recognition methods; and whether there is a possibility of colliding with the object is determined on the basis of the selected result of the object recognition.

MODE(S) FOR CARRYING OUT THE INVENTION

Figure 1:
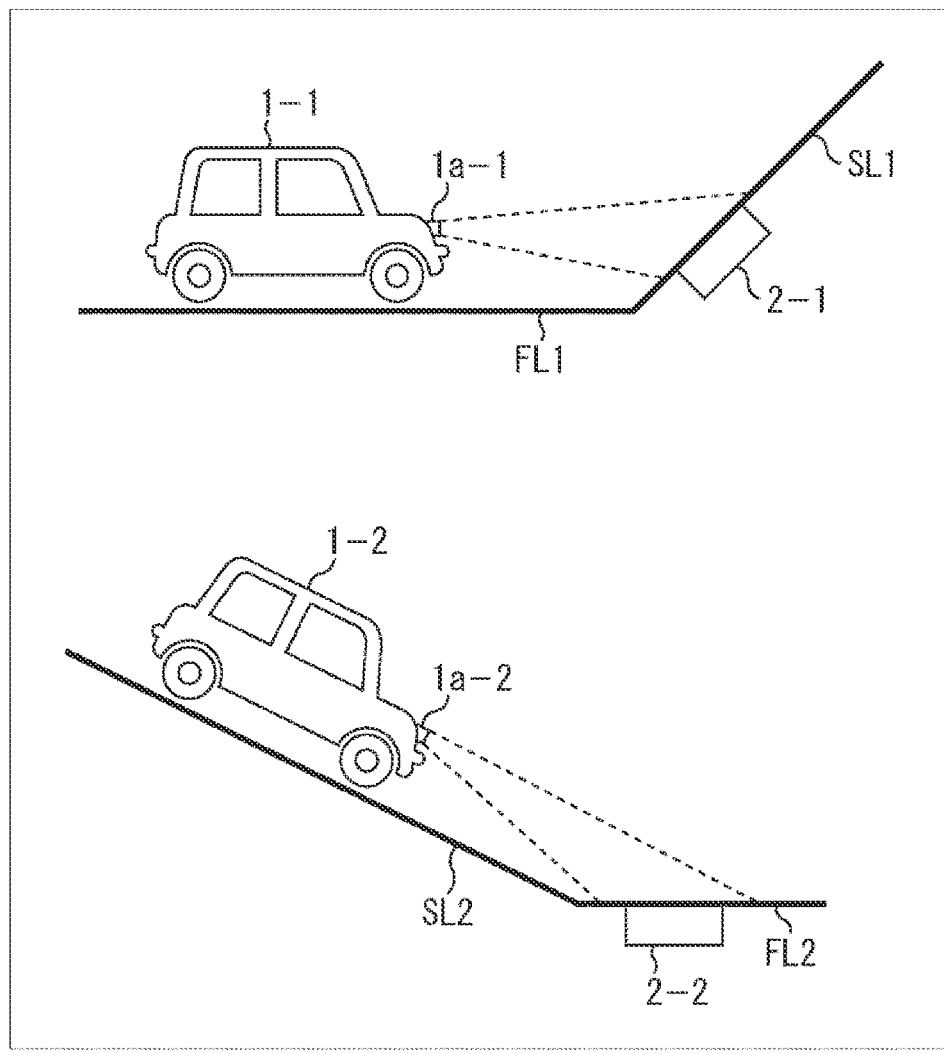
FIG. 1 is a diagram for describing a false detection in a collision determination.

Favorable embodiments of the present disclosure will be described in detail with reference to the accompanying drawings. Note that, in the specification and the drawings, components having substantially the same functional configuration are denoted by the same reference numeral to omit a repetitive description.

Embodiments for carrying out the present technology are described below. The description is made in the following order.

1. Outline of Present Disclosure
2. Example of Configuration of Vehicle Control System That Controls Vehicle of Present Disclosure
3. Configuration in Which False Determination of Obstacle on Inclined Road is Suppressed>
4. Collision Determination Processing
5. Example of Performing Series of Processes Using Software <<1. Outline of Present Disclosure>>
<False Detection in Collision Determination>

An outline of the present disclosure is described.

A vehicle of the present disclosure performs an appropriate collision determination with respect to an obstacle on an inclined road, using an advanced driver-assistance system (ADAS) that is intended to improve the convenience and the safety.

The following case is discussed: a vehicle 1-1 that includes an automated driving function or a driving assistance function travels on a flat road FL1 in a right direction in the figure, as illustrated in, for example, an upper portion of FIG. 1. Here, FIG. 1 illustrates, in the upper portion, the vehicle 1-1 traveling in the right direction in the figure, as viewed from the side of the vehicle 1-1, where an inclined road SL1 is connected to a right end of the flat road FL1 in the figure.

Further, a maintenance hole 2-1 is buried in the road surface of the inclined road SL1.

The vehicle 1-1 includes an external recognition sensor 1a-1 in order to perform an automated driving function or a driving assistance function. Further, the vehicle 1-1 performs sensing with respect to a region situated ahead in a traveling direction using the external recognition sensor 1a-1, as indicated by dotted lines. The vehicle 1-1 detects the presence or absence of an obstacle on a road surface, and, when the obstacle is detected, the vehicle 1-1 performs a movement of an emergency stop or a movement of an emergency avoidance to ensure safety.

Examples of the external recognition sensor 1a-1 include a camera, a millimeter-wave radar, and LiDAR (light detection and ranging, laser imaging detection and ranging).

Here, when the external recognition sensor 1a-1 is a camera, even the size and the type of an object situated ahead can be recognized by use of image recognition in a bright environment in the daytime in fine weather. Thus, in the case of FIG. 1, it is possible to recognize that the maintenance hole 2-1 is buried in the inclined road SL1.

Thus, the maintenance hole 2-1 is recognized as being present on a road surface, but the maintenance hole 2-1 is not recognized as an obstacle.

However, in the case in which the external recognition sensor 1a-1 is a camera and a captured image is used, there is a possibility of not recognizing that the inclined road SL1 is situated ahead and the maintenance hole 2-1 is buried in the inclined road SL1 when there is a change in surrounding environment, for example, at night or during rough weather. In such a case, the automated driving function or the driving assistance function of the vehicle 1-1 fails to work.

Note that, in the case in which the external recognition sensor 1a-1 is a camera, the fact that the maintenance hole 2-1 is not successfully detected is only a problem when there is a change in surrounding environment, for example, at night or during rough weather in the state illustrated in FIG. 1. A problem due to, for example, false detection does not occur.

Next, the case in which the external recognition sensor 1a-1 is a millimeter-wave radar is discussed.

When the external recognition sensor 1a-1 is a millimeter-wave radar, it is possible to recognize, for example, at night or during rough weather, that a certain object exists at a location at which there is the maintenance hole 2-1, although whether a target object is, for example, the inclined road SL1 or the maintenance hole 2-1, is not successfully recognized.

However, when the external recognition sensor 1a-1 is a millimeter-wave radar, the external recognition sensor 1a-1 can recognize that a certain target object is situated in a region situated ahead in a traveling direction, but does not successfully recognize that the maintenance hole 2-1 is buried in the road surface of the inclined road SL1.

Thus, when the external recognition sensor 1a-1 is a millimeter-wave radar, the presence of an obstacle on the flat road FL1 may be falsely detected in a state of the upper portion of FIG. 1, the obstacle being an obstacle having a certain height and with which the vehicle 1-1 may collide.

Consequently, for example, the vehicle 1-1 falsely detects that there is a possibility of colliding with the obstacle, and performs a movement of an emergency stop or a movement of an emergency avoidance in order to avoid the collision. Such a movement of an emergency stop or such a movement of an emergency avoidance may result in bringing about, for example, an accident.

Note that a similar phenomenon may occur when a vehicle 1-2 includes an external recognition sensor 1a-2 that is a camera or a millimeter-wave radar, and is traveling downhill on an inclined road SL2 in the right direction in the figure; a flat road FL2 is connected to a forward end of the inclined road SL2; and a maintenance hole 2-2 is provided to the flat road FL2, as illustrated in a lower portion of FIG. 1.

Note that, when there exists a preceding vehicle, the millimeter-wave radar irradiates radio waves onto a region situated further forward than the preceding vehicle while causing the waves to be reflected off a road surface situated under a vehicle body of the preceding vehicle, and receives the reflected waves. This makes it possible to detect the presence or absence of an object situated further ahead of the preceding vehicle.

Figure 2:
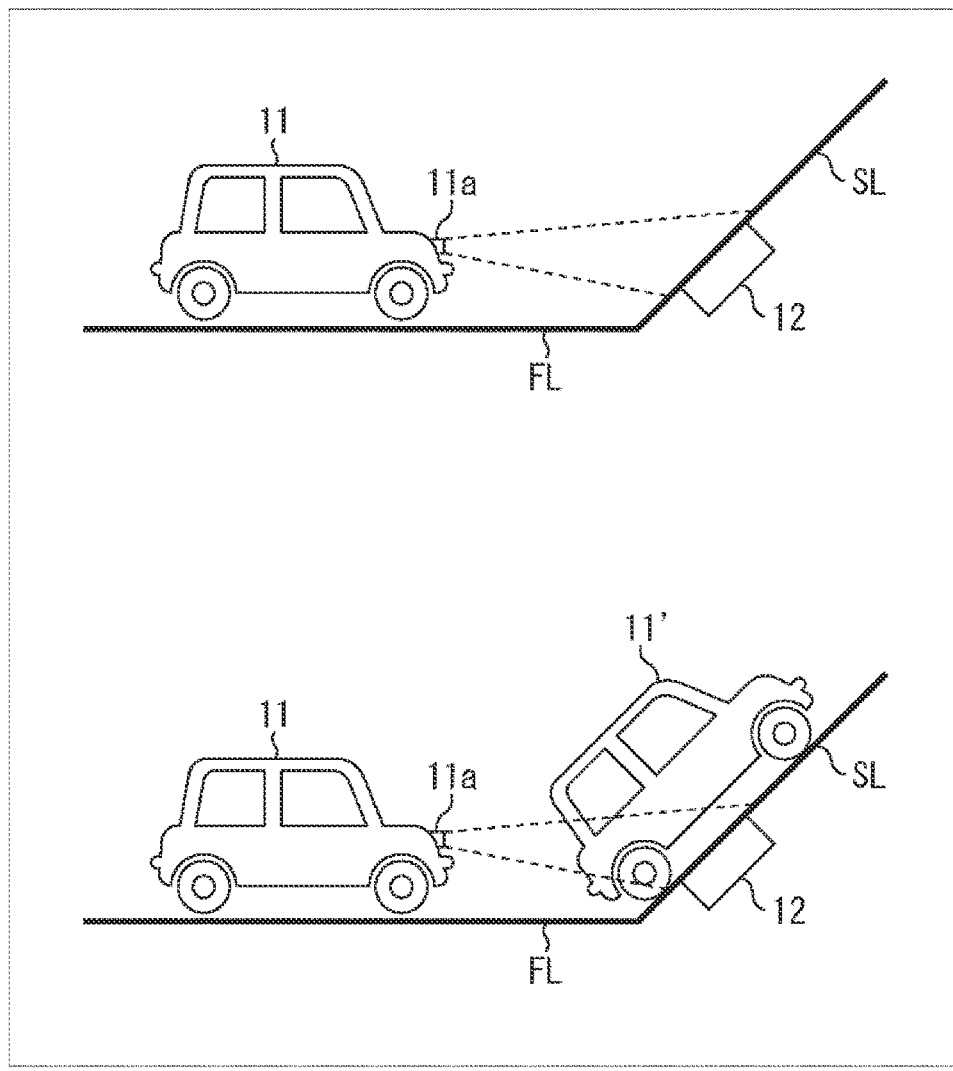
FIG. 2 illustrates an outline of a collision determination performed by a millimeter-wave radar.

Here, the following case is discussed: a vehicle 11 includes an external recognition sensor 11a that is a millimeter-wave radar, and is traveling on a flat road FL in a right direction in the figure while performing sensing with respect to a region situated ahead in a traveling direction; an inclined road SL is situated ahead; and a maintenance hole 12 is buried in the inclined road SL, as illustrated in an upper portion of FIG. 2.

In the case of the upper portion of FIG. 2, due to waves that are irradiated by the external recognition sensor 11a to be reflected off the maintenance hole 12 situated ahead, the vehicle 11 can only recognize that there may exist an obstacle, although the vehicle 11 does not successfully recognize what kind of object it is.

Thus, such information alone does not allow the vehicle 11 to determine whether an object situated ahead is the maintenance hole 12 that is buried in the inclined road SL and with which there is no possibility of colliding, or whether the object situated ahead is an obstacle with which there is a possibility of colliding.

In such a case, in order to suppress the occurrence of a false detection, the vehicle 11 has no option but to notify a driver that there exists a certain object, although what kind of object the certain object is, is not determinable.

However, when a preceding vehicle 11' exists ahead of the vehicle 11, and is traveling in the right direction in the figure, as illustrated in a lower portion of FIG. 2, it is possible to detect whether the preceding vehicle 11' has passed through a location that is the same as the location of the inclined road SL or the maintenance hole 12. In such a case, whether the maintenance hole 12 is an obstacle is unknown. However, when the preceding vehicle 11' has passed through a location at which there exists a certain object, the vehicle 11 can at least recognize that a detected object is not an obstacle with which there is a possibility of colliding.

Thus, in the present disclosure, a millimeter-wave radar is used as the external recognition sensor 11a, as in the case of the vehicle 11 of FIG. 2. As illustrated in the lower portion of FIG. 2, when the vehicle 11 is continuously traveling to recognize an object that may be an obstacle, the vehicle 11 determines whether there is a possibility of colliding with the object recognized as an object that may be an obstacle, on the basis of whether the preceding vehicle 11' has passed through a location of the detected object.

In other words, when the vehicle 11 of the present disclosure recognizes an object situated ahead, the vehicle 11 determines that the recognized object is not an obstacle when the preceding vehicle 11' passed through a location of the object. This results in suppressing the occurrence of a false detection.

However, when the external recognition sensor 11a is a millimeter-wave radar, the occurrence of a false detection is not suppressed unless there exists a preceding vehicle that is traveling through a location at which there exists an object that may be an obstacle.

Here, the case of using LiDAR as the external recognition sensor 11a is discussed.

LiDAR emits laser light in a direction of performing ranging, and receives the reflected light to obtain a distance using a going-and-returning period of time of the light and to acquire group-of-points information at specified intervals in the horizontal direction and in the vertical direction.

Figure 3:
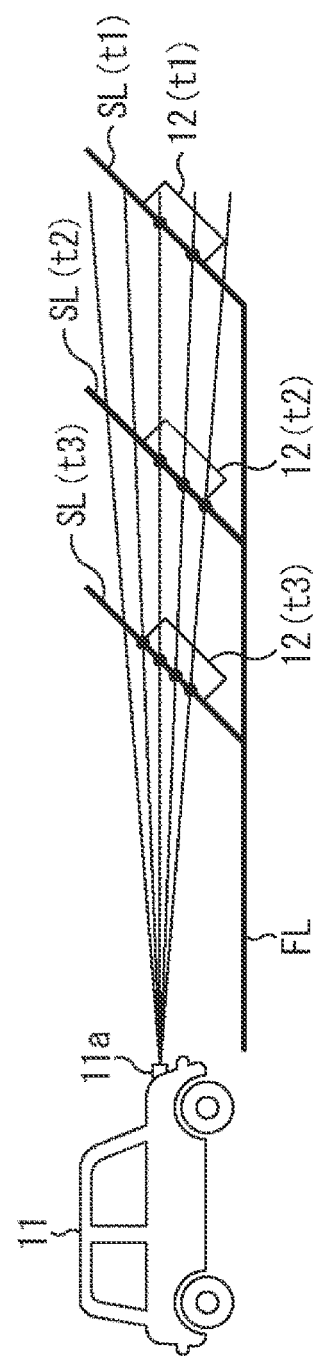
FIG. 3 illustrates an outline of a collision determination performed by LiDAR.

In other words, the external recognition sensor 11a emits, for example, five pieces of laser light in the vertical direction when the vehicle 11 is traveling on the flat road FL in a right direction in the figure, as illustrated in, for example, FIG. 3. Then, the external recognition sensor 11a obtains a distance from a difference between a timing of emitting each piece of light and a timing of receiving the piece of light reflected off the maintenance hole 12 provided to the inclined road SL situated ahead to acquire group-of-points information regarding the maintenance hole 12.

In this case, when the vehicle 11 travels in the right direction in the figure, a distance between the inclined road SL and the vehicle 11 is decreased as time goes on in order of a time t1, a time t2, and a time t3.

Here, two of the five pieces of laser light are reflected off the maintenance hole 12 buried in the inclined road SL at the time t1. Then, three of the five pieces of laser light are reflected off the maintenance hole 12 buried in the inclined road SL at the time t2, and four of the five pieces of laser light are reflected off the maintenance hole 12 buried in the inclined road SL at the time t3.

In other words, the number of pieces of laser light reflected off the maintenance hole 12 is increased as the vehicle 11 gets closer to the inclined road SL.

In other words, the number of pieces of laser light reflected off the maintenance hole 12 is changed as the external recognition sensor 11a that is LiDAR gets closer to the maintenance hole 12. This makes it possible to recognize, on the basis of three-dimensional group-of-points information, the size of the maintenance hole 12, and an inclination of the inclined road SL based on a time-series change in the size of the maintenance hole 12.

Consequently, the use of the group-of-points information enables the vehicle 11 to recognize that an object situated ahead is the inclined road SL and the maintenance hole 12 is buried in the inclined road SL, and thus to suppress the occurrence of a false detection such as falsely detecting that the object situated ahead is an obstacle.

Thus, in the present disclosure, three types of external recognition sensors 11a that are a camera, a millimeter-wave radar, and LiDAR are combined, and the respective sensing results are selectively used depending on the environment. This results in suppressing a false detection in an object detection.

In other words, a result of recognition performed on the basis of an image captured by a camera used as the external recognition sensor 11a, for example, in bright daylight in fine weather. For example, a result of sensing performed by a millimeter-wave radar is used when there exists a preceding vehicle at night or during rough weather, and a result of sensing performed by LiDAR is used when there exists no preceding vehicle at night or during rough weather.

As described above, when sensing results obtained by the external recognition sensor 11a including a plurality of sensors are selectively used depending on the environment, this makes it possible to appropriately perform a collision determination according to the characteristics of each of the plurality of sensors, and thus to suppress the occurrence of a false detection.

<<2. Example of Configuration of Vehicle Control System That Controls Vehicle of Present Disclosure>>

Next, a vehicle control system for a vehicle of the present disclosure is described with reference to a block diagram of FIG. 4.

Figure 4:
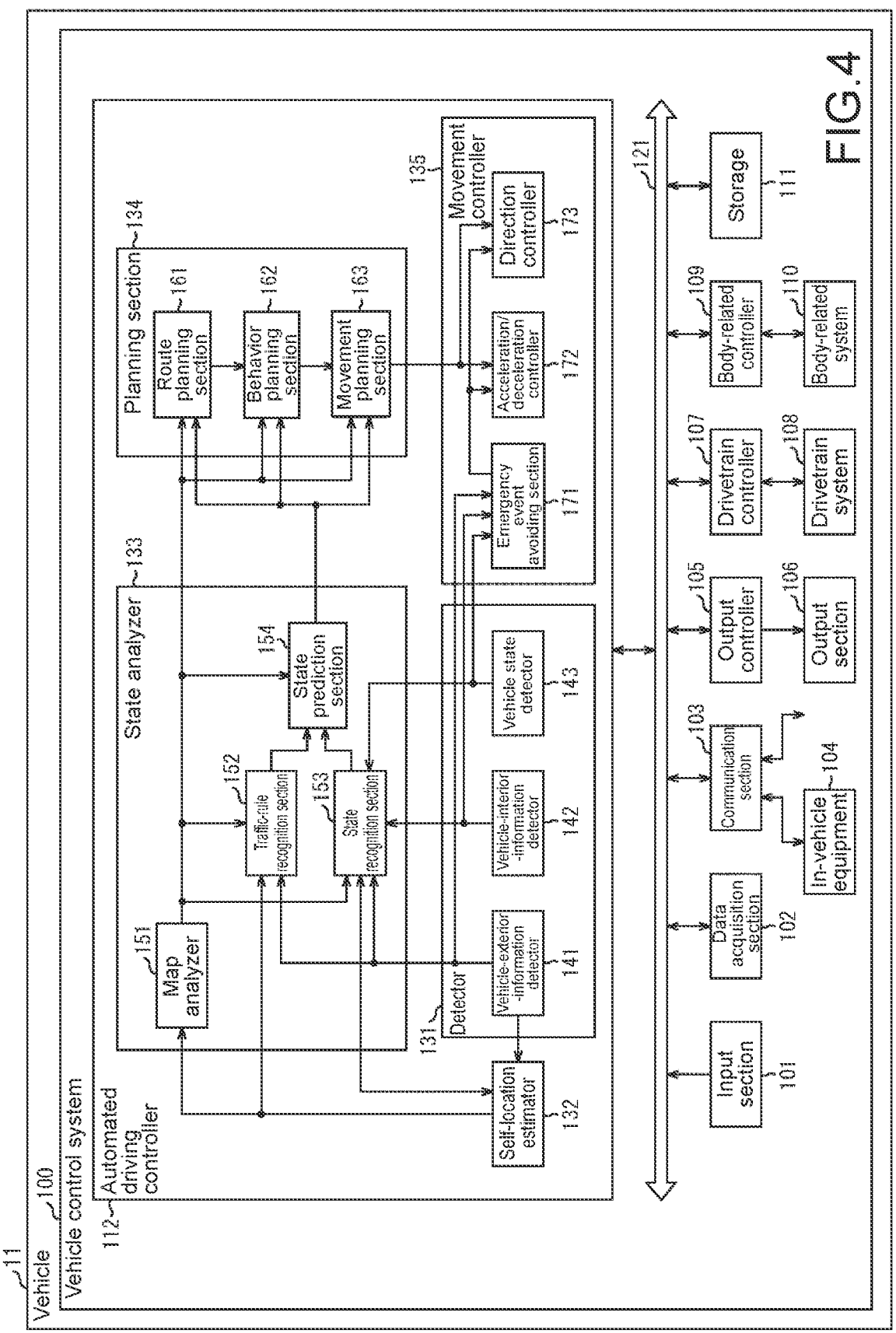
FIG. 4 is a block diagram illustrating an example of a configuration of a vehicle control system of the present disclosure.

FIG. 4 is a block diagram illustrating an example of a schematic functional configuration of a vehicle control system 100 that is an example of a mobile-object control system to which the present technology is applicable. The vehicle control system 100 is mounted on the vehicle 11.

Note that, when a vehicle provided with the vehicle control system 100 is to be distinguished from other vehicles, the vehicle provided with the vehicle control system 100 will be hereinafter referred to as an own automobile or an own vehicle.

The vehicle control system 100 includes an input section 101, a data acquisition section 102, a communication section 103, in-vehicle equipment 104, an output controller 105, an output section 106, a drivetrain controller 107, a drivetrain system 108, a body-related controller 109, a body-related system 110, a storage 111, and an automated driving controller 112. The input section 101, the data acquisition section 102, the communication section 103, the output controller 105, the drivetrain controller 107, the body-related controller 109, the storage 111, and the automated driving controller 112 are connected to each other through a communication network 121. For example, the communication network 121 includes a bus or a vehicle-mounted communication network compliant with any standard such as a controller area network (CAN), a local interconnect network (LIN), a local area network (LAN), or FlexRay (registered trademark). Note that the respective structural elements of the vehicle control system 100 may be directly connected to each other without using the communication network 121.

Note that the description of the communication network 121 will be omitted below when the respective structural elements of the vehicle control system 100 communicate with each other through the communication network 121. For example, when the input section 101 and the automated driving controller 112 communicate with each other through the communication network 121, it will be simply stated that the input section 101 and the automated driving controller 112 communicate with each other.

The input section 101 includes an apparatus used by a person on board to input various pieces of data, instructions, and the like. For example, the input section 101 includes an operation device such as a touch panel, a button, a microphone, a switch, and a lever; an operation device with which input can be performed by a method other than a manual operation, such as sound or a gesture; and the like. Alternatively, for example, the input section 101 may be externally connected equipment such as a remote-control apparatus using infrared or another radio wave, or mobile equipment or wearable equipment compatible with an operation of the vehicle control system 100. The input section 101 generates an input signal on the basis of data, an instruction, or the like input by a person on board, and supplies the generated input signal to the respective structural elements of the vehicle control system 100.

The data acquisition section 102 includes various sensors and the like for acquiring data used for a process performed by the vehicle control system 100, and supplies the acquired data to the respective structural elements of the vehicle control system 100.

For example, the data acquisition section 102 includes various sensors used to detect, for example, a state of the own automobile. Specifically, for example, the data acquisition section 102 includes a gyroscope; an acceleration sensor; an inertial measurement unit (IMU); and a sensor or the like used to detect an amount of operation of an accelerator pedal, an amount of operation of a brake pedal, a steering angle of a steering wheel, the number of revolutions of an engine, the number of revolutions of a motor, a speed of wheel rotation, or the like.

Further, for example, the data acquisition section 102 includes various sensors used to detect information regarding the outside of the own automobile. Specifically, for example, the data acquisition section 102 includes an image-capturing apparatus such as a time-of-flight (ToF) camera, a stereo camera, a monocular camera, an infrared camera, and other cameras. Furthermore, for example, the data acquisition section 102 includes an environment sensor used to detect weather, a meteorological phenomenon, or the like, and a surrounding-information detection sensor used to detect an object around the own automobile. For example, the environment sensor includes a raindrop sensor, a fog sensor, a sunshine sensor, a snow sensor, and the like. The surrounding-information detection sensor includes an ultrasonic sensor, a radar, LiDAR (light detection and ranging, laser imaging detection and ranging), a sonar, and the like.

Moreover, for example, the data acquisition section 102 includes various sensors used to detect the current location of the own automobile. Specifically, for example, the data acquisition section 102 includes, for example, a global navigation satellite system (GNSS) receiver that receives a GNSS signal from a GNSS satellite.

Further, for example, the data acquisition section 102 includes various sensors used to detect information regarding the inside of a vehicle. Specifically, for example, the data acquisition section 102 includes an image-capturing apparatus that captures an image of a driver, a biological sensor that detects biological information of the driver, a microphone that collects sound in the interior of a vehicle, and the like. For example, the biological sensor is provided to a seat surface, the steering wheel, or the like, and detects biological information of a person on board sitting on a seat, or a driver holding the steering wheel.

The communication section 103 communicates with the in-vehicle equipment 104 as well as various pieces of vehicle-exterior equipment, a server, a base station, and the like, transmits data supplied by the respective structural elements of the vehicle control system 100, and supplies the received data to the respective structural elements of the vehicle control system 100. Note that a communication protocol supported by the communication section 103 is not particularly limited. It is also possible for the communication section 103 to support a plurality of types of communication protocols.

For example, the communication section 103 wirelessly communicates with the in-vehicle equipment 104 using a wireless LAN, Bluetooth (registered trademark), near-field communication (NFC), a wireless USB (WUSB), or the like. Further, for example, the communication section 103 communicates with the in-vehicle equipment 104 by wire using a universal serial bus (USB), a high-definition multimedia interface (HDMI) (registered trademark), a mobile high-definition link (MHL), or the like through a connection terminal (not illustrated) (and a cable if necessary).

Further, for example, the communication section 103 communicates with equipment (for example, an application server or a control server) situated in an external network (for example, the Internet, a cloud network, or a carrier-specific network) through a base station or an access point. Furthermore, for example, the communication section 103 communicates with a terminal (for example, a terminal of a pedestrian or a store, or a machine-type communication (MTC) terminal) situated near the own automobile, using a peer-to-peer (P2P) technology. Moreover, for example, the communication section 103 performs V2X communication such as vehicle-to-vehicle communication, vehicle-to-infrastructure communication, vehicle-to-home communication between the own automobile and a home, and vehicle-to-pedestrian communication. Further, for example, the communication section 103 includes a beacon receiver, receives a radio wave or an electromagnetic wave transmitted from, for example, a radio station installed on a road, and acquires information regarding, for example, the current location, traffic congestion, traffic regulation, or a necessary time.

Examples of the in-vehicle equipment 104 include mobile equipment or wearable equipment of a person on board, information equipment that is brought in or attached to the own automobile, and a navigation apparatus that searches for a route to any destination.

The output controller 105 controls output of various pieces of information to a person on board of the own automobile or to the outside of the own automobile. For example, the output controller 105 generates an output signal that includes at least one of visual information (such as image data) or audio information (such as sound data), supplies the output signal to the output section 106, and thereby controls output of the visual information and the audio information from the output section 106. Specifically, for example, the output controller 105 combines pieces of data of images captured by different image-capturing apparatuses of the data acquisition section 102, generates a bird's-eye image, a panoramic image, or the like, and supplies an output signal including the generated image to the output section 106. Further, for example, the output controller 105 generates sound data including, for example, a warning beep or a warning message alerting a danger such as collision, contact, or entrance into a dangerous zone, and supplies an output signal including the generated sound data to the output section 106.

The output section 106 includes an apparatus capable of outputting the visual information or the audio information to a person on board of the own automobile or to the outside of the own automobile. For example, the output section 106 includes a display apparatus, an instrument panel, an audio speaker, headphones, a wearable device such as an eyeglass-type display used to be worn on the person on board, a projector, a lamp, and the like. Instead of an apparatus including a commonly used display, the display apparatus included in the output section 106 may be an apparatus, such as a head-up display, a transparent display, or an apparatus including an augmented reality (AR) display function, that displays the visual information in the field of view of a driver.

The drivetrain controller 107 generates various control signals, supplies them to the drivetrain system 108, and thereby controls the drivetrain system 108. Further, the drivetrain controller 107 supplies the control signals to the structural elements other than the drivetrain system 108 as necessary to, for example, notify them of a state of controlling the drivetrain system 108.

The drivetrain system 108 includes various apparatuses related to the drivetrain of the own automobile. For example, the drivetrain system 108 includes a driving force generation apparatus, such as an internal-combustion engine and a driving motor, that generates driving force, a driving force transmitting mechanism used to transmit the driving force to wheels, a steering mechanism that adjusts the steering angle, a braking apparatus that generates a braking force, an antilock braking system (ABS), an electronic stability control (ESC) system, an electric power steering apparatus, and the like.

The body-related controller 109 generates various control signals, supplies them to the body-related system 110, and thereby controls the body-related system 110. Further, the body-related controller 109 supplies the control signals to the structural elements other than the body-related system 110 as necessary to, for example, notify them of a state of controlling the body-related system 110.

The body-related system 110 includes various body-related apparatuses provided to a vehicle body. For example, the body-related system 110 includes a keyless entry system, a smart key system, a power window apparatus, a power seat, a steering wheel, an air conditioner, various lamps (such as a headlamp, a tail lamp, a brake lamp, a blinker, and a fog lamp), and the like.

For example, the storage 111 includes a read only memory (ROM), a random access memory (RAM), a magnetic storage device such as a hard disc drive (HDD), a semiconductor storage device, an optical storage device, a magneto-optical storage device, and the like. The storage 111 stores therein various programs, data, and the like that are used by the respective structural elements of the vehicle control system 100. For example, the storage 111 stores therein map data such as a three-dimensional high-accuracy map, a global map, and a local map. The high-accuracy map is a dynamic map or the like. The global map is less accurate and covers a wider area than the high-accuracy map. The local map includes information regarding the surroundings of the own automobile.

The automated driving controller 112 performs control related to automated driving such as autonomous traveling or a driving assistance. Specifically, for example, the automated driving controller 112 performs a cooperative control intended to implement a function of an advanced driver-assistance system (ADAS) including collision avoidance or shock mitigation for the own automobile, traveling after a leading vehicle based on a distance between vehicles, traveling while maintaining a vehicle speed, a warning of collision of the own automobile, a warning of deviation of the own automobile from a lane, and the like. Further, for example, the automated driving controller 112 performs a cooperative control intended to achieve, for example, automated driving that is autonomous traveling without an operation performed by a driver. The automated driving controller 112 includes a detector 131, a self-location estimator 132, a state analyzer 133, a planning section 134, and a movement controller 135.

The detector 131 detects various pieces of information necessary to control automated driving. The detector 131 includes a vehicle-exterior-information detector 141, a vehicle-interior-information detector 142, and a vehicle state detector 143.

The vehicle-exterior-information detector 141 performs a process of detecting information regarding the outside of the own automobile on the basis of data or a signal from each structural element of the vehicle control system 100. For example, the vehicle-exterior-information detector 141 performs processes of detecting, recognizing, and tracking an object around the own automobile, and a process of detecting a distance to the object. Examples of the detection-target object include a vehicle, a person, an obstacle, a structure, a road, a traffic light, a traffic sign, and a road sign. Further, for example, the vehicle-exterior-information detector 141 performs a process of detecting an environment surrounding the own automobile. Examples of the detection-target surrounding environment include weather, temperature, humidity, brightness, and a road surface condition. The vehicle-exterior-information detector 141 supplies data indicating a result of the detection process to, for example, the self-location estimator 132; a map analyzer 151, a traffic-rule recognition section 152, and a state recognition section 153 of the state analyzer 133; and an emergency event avoiding section 171 of the movement controller 135.

The vehicle-interior-information detector 142 performs a process of detecting information regarding the inside of a vehicle on the basis of data or a signal from each structural element of the vehicle control system 100. For example, the vehicle-interior-information detector 142 performs processes of authenticating and recognizing a driver, a process of detecting a state of the driver, a process of detecting a person on board, and a process of detecting a vehicle interior environment. Examples of the detection-target state of a driver include a physical condition, a degree of arousal, a degree of concentration, a degree of fatigue, and a direction of a line of sight. Examples of the detection-target vehicle interior environment include temperature, humidity, brightness, and odor. The vehicle-interior-information detector 142 supplies data indicating a result of the detection process to, for example, the state recognition section 153 of the state analyzer 133 and the emergency event avoiding section 171 of the movement controller 135.

The vehicle state detector 143 performs a process of detecting a state of the own automobile on the basis of data or a signal from each structural element of the vehicle control system 100. Examples of the detection-target state of the own automobile include speed, acceleration, a steering angle, the presence or absence of anomaly and its details, a driving operation state, a position and an inclination of a power seat, a state of a door lock, and states of other pieces of vehicle-mounted equipment. The vehicle state detector 143 supplies data indicating a result of the detection process to, for example, the state recognition section 153 of the state analyzer 133 and the emergency event avoiding section 171 of the movement controller 135.

The self-location estimator 132 performs a process of estimating a location, a posture, and the like of the own automobile on the basis of data or signals from the respective structural elements of the vehicle control system 100, such as the vehicle-exterior-information detector 141, and the state recognition section 153 of the state analyzer 133. Further, the self-location estimator 132 generates, as necessary, a local map (hereinafter referred to as a self-location estimation map) used to estimate a self-location. For example, the self-location estimation map is a high-accuracy map using a technology such as simultaneous localization and mapping (SLAM). The self-location estimator 132 supplies data indicating a result of the estimation process to, for example, the map analyzer 151, the traffic-rule recognition section 152, and the state recognition section 153 of the state analyzer 133. Further, the self-location estimator 132 stores the self-location estimation map in the storage 111.

The state analyzer 133 performs a process of analyzing states of the own automobile and its surroundings. The state analyzer 133 includes the map analyzer 151, the traffic-rule recognition section 152, the state recognition section 153, and a state prediction section 154.

Using, as necessary, data or signals from the respective structural elements of the vehicle control system 100, such as the self-location estimator 132 and the vehicle-exterior-information detector 141, the map analyzer 151 performs a process of analyzing various maps stored in the storage 111, and constructs a map including information necessary for an automated driving process. The map analyzer 151 supplies the constructed map to, for example, the traffic-rule recognition section 152, the state recognition section 153, and the state prediction section 154, as well as a route planning section 161, a behavior planning section 162, and a movement planning section 163 of the planning section 134.

The traffic-rule recognition section 152 performs a process of recognizing traffic rules around the own automobile on the basis of data or signals from the respective structural elements of the vehicle control system 100, such as the self-location estimator 132, the vehicle-exterior-information detector 141, and the map analyzer 151. The recognition process makes it possible to recognize a location and a state of a traffic light around the own automobile, the details of traffic control performed around the own automobile, and a travelable lane. The traffic-rule recognition section 152 supplies data indicating a result of the recognition process to, for example, the state prediction section 154.

The state recognition section 153 performs a process of recognizing a state related to the own automobile on the basis of data or signals from the respective structural elements of the vehicle control system 100, such as the self-location estimator 132, the vehicle-exterior-information detector 141, the vehicle-interior-information detector 142, the vehicle state detector 143, and the map analyzer 151. For example, the state recognition section 153 performs a process of recognizing a state of the own automobile, a state of the surroundings of the own automobile, a state of a driver of the own automobile, and the like. Further, the state recognition section 153 generates, as necessary, a local map (hereinafter referred to as a state recognition map) used to recognize the state of the surroundings of the own automobile. The state recognition map is, for example, an occupancy grid map.

Examples of the recognition-target state of the own automobile include a location, a posture, and movement (such as speed, acceleration, and a movement direction) of the own automobile, as well as the presence or absence of anomaly and its details. Examples of the recognition-target state of the surroundings of the own automobile include the type and a location of a stationary object around the own automobile; the type, a location, and movement (such as speed, acceleration, and a movement direction) of a moving object around the own automobile; a structure of a road around the own automobile and a condition of the surface of the road; and weather, temperature, humidity, and brightness around the own automobile. Examples of the recognition-target state of a driver include a physical condition, a degree of arousal, a degree of concentration, a degree of fatigue, movement of a line of sight, and a driving operation.

The state recognition section 153 supplies data indicating a result of the recognition process (including a state recognition map as necessary) to, for example, the self-location estimator 132 and the state prediction section 154. Further, the state recognition section 153 stores the state-recognition map in the storage 111.

The state prediction section 154 performs a process of predicting a state related to the own automobile on the basis of data or signals from the respective structural elements of the vehicle control system 100, such as the map analyzer 151, the traffic-rule recognition section 152, and the state recognition section 153. For example, the state prediction section 154 performs a process of predicting a state of the own automobile, a state of the surroundings of the own automobile, a state of a driver, and the like.

Examples of the prediction-target state of the own automobile include the behavior of the own automobile, the occurrence of anomaly in the own automobile, and a travelable distance of the own automobile. Examples of the prediction-target state of the surroundings of the own automobile include the behavior of a moving object, a change in a state of a traffic light, and a change in environment such as weather around the own automobile. Examples of the prediction-target state of a driver include the behavior and the physical condition of the driver.

The state prediction section 154 supplies data indicating a result of the prediction process to, for example, the route planning section 161, the behavior planning section 162, and the movement planning section 163 of the planning section 134 together with the data from the traffic-rule recognition section 152 and the state recognition section 153.

The route planning section 161 plans a route to a destination on the basis of data or signals from the respective structural elements of the vehicle control system 100, such as the map analyzer 151 and the state prediction section 154. For example, the route planning section 161 sets a route from the current location to a specified destination on the basis of a global map. Further, for example, the route planning section 161 changes a route as appropriate on the basis of the states of, for example, traffic congestion, an accident, traffic regulation, and a construction, as well as the physical condition of a driver. The route planning section 161 supplies data indicating the planned route to, for example, the behavior planning section 162.

On the basis of data or signals from the respective structural elements of the vehicle control system 100, such as the map analyzer 151 and the state prediction section 154, the behavior planning section 162 plans the behavior of the own automobile in order for the own automobile to travel safely on the route planned by the route planning section 161 within a time planned by the route planning section 161. For example, the behavior planning section 162 makes plans about, for example, a start to move, a stop, a travel direction (such as a forward movement, a backward movement, a left turn, a right turn, and a change in direction), a lane for traveling, a traveling speed, and passing. The behavior planning section 162 supplies data indicating the planned behavior of the own automobile to, for example, the movement planning section 163.

On the basis of data or signals from the respective structural elements of the vehicle control system 100, such as the map analyzer 151 and the state prediction section 154, the movement planning section 163 plans movement of the own automobile in order to achieve the behavior planned by the behavior planning section 162. For example, the movement planning section 163 makes plans about, for example, acceleration, deceleration, and a traveling course. The movement planning section 163 supplies data indicating the planned movement of the own automobile to, for example, an acceleration/deceleration controller 172 and a direction controller 173 of the movement controller 135.

The movement controller 135 controls movement of the own automobile. The movement controller 135 includes the emergency event avoiding section 171, the acceleration/deceleration controller 172, and the direction controller 173.

On the basis of a result of the detections performed by the vehicle-exterior-information detector 141, the vehicle-interior-information detector 142, and the vehicle state detector 143, the emergency event avoiding section 171 performs a process of detecting emergency events such as collision, contact, entrance into a dangerous zone, something unusual in a driver, and anomaly in the vehicle. When the emergency event avoiding section 171 detects the occurrence of an emergency event, the emergency event avoiding section 171 plans movement of the own automobile such as a sudden stop or a quick turning for avoiding the emergency event. The emergency event avoiding section 171 supplies data indicating the planned movement of the own automobile to, for example, the acceleration/deceleration controller 172 and the direction controller 173.

The acceleration/deceleration controller 172 controls acceleration/deceleration to achieve the movement of the own automobile planned by the movement planning section 163 or the emergency event avoiding section 171. For example, the acceleration/deceleration controller 172 computes a control target value for a driving force generation apparatus or a braking apparatus to achieve the planned acceleration, the planned deceleration, or the planned sudden stop, and supplies a control instruction indicating the computed control target value to the drivetrain controller 107.

The direction controller 173 controls a direction to achieve the movement of the own automobile planned by the movement planning section 163 or the emergency event avoiding section 171. For example, the direction controller 173 computes a control target value for a steering mechanism to achieve the traveling course planned by the movement planning section 163 or the quick turning planned by the emergency event avoiding section 171, and supplies a control instruction indicating the computed control target value to the drivetrain controller 107.

<<3. Configuration in Which False Determination of Obstacle on Inclined Road is Suppressed>>

Figure 5:
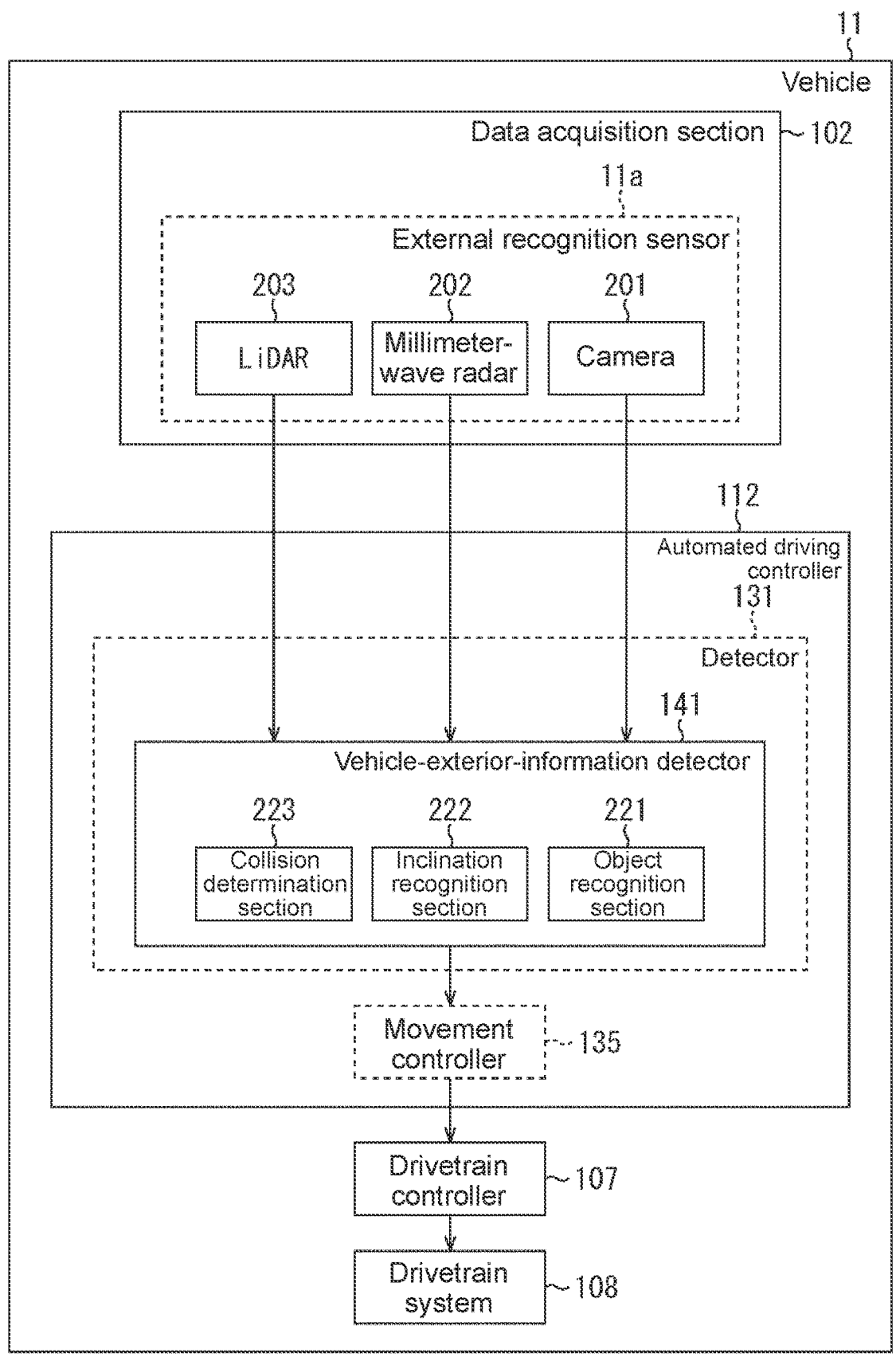
FIG. 5 is a block diagram illustrating an example of a configuration of the vehicle control system of FIG. 4 in which a false determination is suppressed.

Next, a configuration in which a false determination of an obstacle on an inclined road is suppressed is described with reference to a block diagram of FIG. 5. Note that FIG. 5 illustrates a configuration including a component, from among the example of the functional configuration implementing the vehicle control system 100 described with reference to FIG. 4, that is used to suppress a false determination of an obstacle on the inclined road.

The data acquisition section 102 includes a camera 201, a millimeter-wave radar 202, and LiDAR 203. All of the camera 201, the millimeter-wave radar 202, and the LiDAR 203 detect an object in a region situated ahead in a traveling direction of the vehicle 11, such as a region situated ahead of the vehicle 11 and an upper portion of a windshield of the vehicle 11. For example, the camera 201, the millimeter-wave radar 202, and the LiDAR 203 correspond to the external recognition sensor 11a of the vehicle 11 of FIGS. 2 and 3.

The camera 201 captures an image of a region situated ahead in the traveling direction, and outputs the captured image to the vehicle-exterior-information detector 141 of the detector 131 in the automated driving controller 112.

The millimeter-wave radar 202 irradiates radio waves in the millimeter-wave band onto the region situated ahead in the traveling direction, receives the waves reflected off an object to detect information regarding a location and a speed of the object, and outputs the detected information to the vehicle-exterior-information detector 141 of the detector 131 in the automated driving controller 112.

The LiDAR 203 horizontally and vertically emits laser light to the region situated ahead in the traveling direction at specified intervals, and receives the light reflected off an object to detect group-of-points information depending on a location and a shape of the object, and outputs the detected group-of-points information to the vehicle-exterior-information detector 141 of the detector 131 in the automated driving controller 112.

On the basis of an image captured by the camera 201, a result of detection performed by the millimeter-wave radar 202, and a result of sensing performed by the LiDAR 203, the vehicle-exterior-information detector 141 recognizes an object situated ahead of the vehicle 11, and performs a collision determination on the basis of a result of the recognition. More specifically, the vehicle-exterior-information detector 141 includes an object recognition section 221, an inclination recognition section 222, and a collision determination section 223.

The object recognition section 221 recognizes an object on the basis of the respective results of sensing performed by the camera 201, the millimeter-wave radar 202, and the LiDAR 203.

More specifically, on the basis of a captured image that is the result of sensing performed by the camera 201, the object recognition section 221 recognizes, for each pixel, every single object that is situated in the path and appears in the image, using, for example, semantic segmentation. Thus, for example, when the road surface in the path is an inclined road surface, or when there exists a maintenance hole or a grating, the object recognition section 221 can recognize, from the image, that an inclined road is situated ahead, or a maintenance hole or a grating is situated ahead.

Further, the object recognition section 221 recognizes the presence or absence of an object in the path on the basis of the result of sensing performed by the millimeter-wave radar 202. In this case, from among radio waves in the millimeter-wave band that are irradiated onto a region situated ahead, the object recognition section 221 recognizes a radio wave with a high reflection intensity as a wave reflected off the object. However, when only a result of sensing performed by the millimeter-wave radar 202 is used, the object recognition section 221 can recognize a location of (a distance to and an orientation of) an object, but does not successfully recognize, for example, whether the object is a vehicle or a pedestrian, that is, what the object is, and the size and the like of the object.

Note that, even when there exists a preceding vehicle, a portion of radio waves in the millimeter-wave band are reflected off a road surface situated under a vehicle body of the preceding vehicle, and this results in the waves reflected off an object situated further forward than the preceding vehicle being received. This enables the object recognition section 221 to recognize, for example, the presence of an object situated further ahead of the preceding vehicle, on the basis of a result of sensing performed by the millimeter-wave radar 202.

Further, the object recognition section 221 recognizes an object in the path on the basis of the result of sensing performed by the LiDAR 203. In this case, as in the case of the millimeter-wave radar, the object recognition section 221 can recognize that an object is situated ahead, since the result of sensing performed by the LiDAR 203 is represented by three-dimensional group-of-points information. However, when the result of sensing performed by the LiDAR 203 is used, the object recognition section 221 does not successfully recognize what kind of object a detected object is. Further, for example, when there exists, for example, a preceding vehicle, it is difficult to acquire information regarding a region situated ahead of the preceding vehicle since the result of sensing performed by the LiDAR 203 is represented by laser light. Thus, in an object recognition performed on the basis of a result of sensing performed by the LiDAR 203, an object recognition necessary for a collision determination is not successfully performed when there exists a preceding vehicle. Note that, in the case in which a result of sensing performed by the LiDAR 203 is used, and when there exists an object and the LiDAR 203 gets closer to the object as time goes on, the number of pieces of reflected laser light is increased as the LiDAR 203 gets closer to the object, as described with reference to FIG. 3. This enables the object recognition section 221 to recognize the size and an inclination of an object on the basis of a change in the number of pieces of reflected laser light.

The inclination recognition section 222 recognizes an inclination of a road surface in the path on the basis of a result of an object recognition performed on the basis of an image captured by the camera 201 and a result of an object detection performed on the basis of a result of sensing performed by the LiDAR 203 from among results of recognition performed by the object recognition section 221. For example, when a result of an object recognition performed using an image captured by the camera 201 is used, the inclination recognition section 222 recognizes an inclination of a road surface from information regarding a region of the road surface on the basis of the result of the object recognition.

Further, for example, when a result of an object recognition performed using a result of sensing performed by the LiDAR is used, the inclination recognition section 222 recognizes an object on the basis of a time-series change in an object recognized in three-dimensional group-of-points information. More specifically, when a result of sensing performed by the millimeter-wave radar is used, the number of pieces of laser light (the area of laser light) reflected off an object is increased as the millimeter-wave radar gets closer to the object. Thus, the object recognition section 221 recognizes the size of the object on the basis of the number of pieces of laser light (the area of laser light) reflected off the object. Further, the inclination recognition section 222 recognizes an inclination of a road surface on the basis of a time-series change in the number of pieces of laser light reflected off the object.

Note that it is difficult to obtain an inclination of a road surface from, for example, a result of sensing performed by a millimeter-wave radar.

On the basis of a result of an object recognition performed by the object recognition section 221, the collision determination section 223 performs a collision determination for determining whether there is a possibility of colliding with an object in the path.

The collision determination section 223 performs a collision determination selectively using results of an object recognition depending on the environmental condition.

In the daytime in fine weather, the collision determination section 223 performs a collision determination on the basis of a result of an object recognition performed on the basis of an image captured by the camera 201.

Further, at night or during rough weather, the collision determination section 223 performs a collision determination using a result of an object recognition performed using a result of sensing performed by the millimeter-wave radar 202 and using a result of an object recognition performed using a result of sensing performed by the LiDAR 203.

In this case, when there exists a preceding vehicle, the collision determination section 223 recognizes the presence of an object in the path on the basis of a result of an object recognition performed using a result of sensing performed by the millimeter-wave radar 202, and the collision determination section 223 performs a collision determination on the basis of whether the preceding vehicle has passed through a location of the recognized object.

In other words, when a collision determination is performed on the basis of a result of an object recognition performed using a result of sensing performed by the millimeter-wave radar 202, the collision determination section 223 can recognize the presence of a preceding vehicle and the presence of an object situated further ahead of the preceding vehicle.

However, when a result of an object recognition performed using a result of sensing performed by the millimeter-wave radar 202 is used, it is possible to recognize the presence of an object, but it is difficult to distinguish whether the object is an object with which there is a need to consider the possibility of colliding.

Thus, in the case in which the collision determination section 223 performs a collision determination on the basis of a result of an object recognition performed using a result of sensing performed by the millimeter-wave radar 202, and in the case in which there exists a preceding vehicle, the collision determination section 223 determines that there is no possibility of colliding with a recognized object when the preceding vehicle has passed through a location of the recognized object.

Further, in the case in which the collision determination section 223 performs a collision determination on the basis of a result of an object recognition performed using a result of sensing performed by the millimeter-wave radar 202, and in the case in which there exists a preceding vehicle, the collision determination section 223 determines that there is a possibility of colliding with a recognized object when the preceding vehicle has not passed through a location of the recognized object, that is, when it is possible to recognize that the preceding vehicle has passed while avoiding the recognized object.

Furthermore, when there exists no preceding vehicle, the collision determination section 223 recognizes that an object exists in the path, on the basis of a result of an object recognition performed using a result of sensing performed by the LiDAR 203, and performs a collision determination.

In other words, when a collision determination is performed on the basis of a result of an object recognition performed using a result of sensing performed by the LiDAR 203, the collision determination section 223 can recognize the size and an inclination of an object according to a change in the number of pieces of laser light reflected off the object from among emitted laser light, since the number of pieces of laser light reflected off the object is chronologically increased as the LiDAR 203 gets closer to the object.

Figure 6:
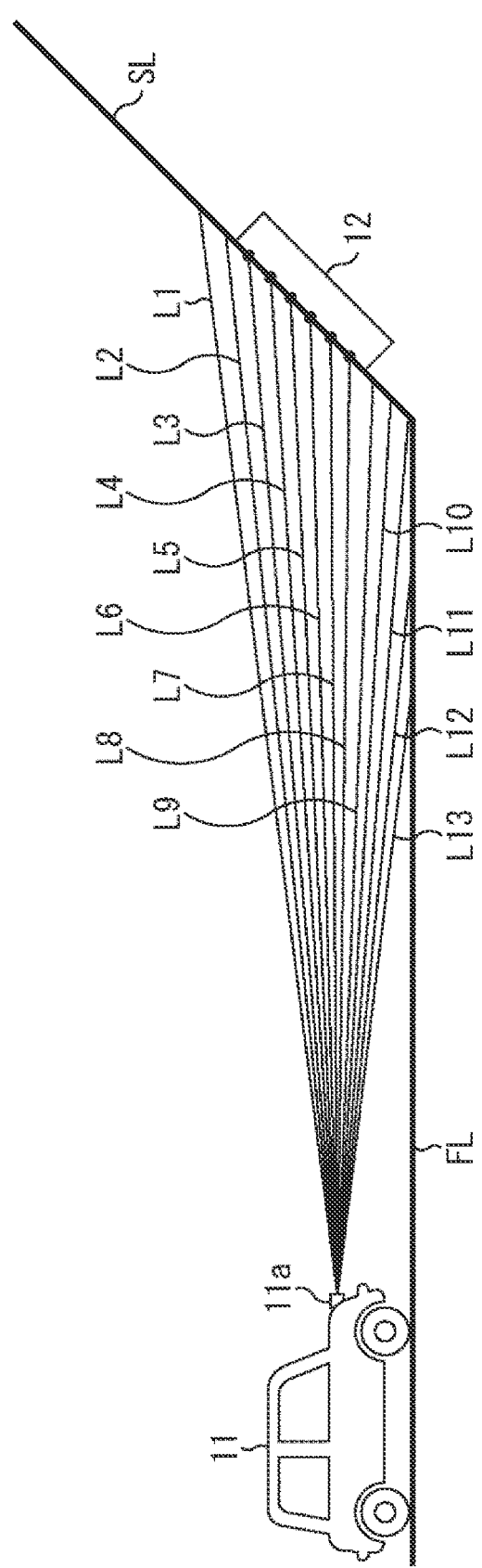
FIG. 6 is a diagram for describing a collision determination performed by LiDAR.

More specifically, it is assumed that, as illustrated in FIG. 6, the vehicle 11 is traveling on the flat road FL in a right direction in the figure, a right end of the flat road FL is connected to the inclined road SL, and the maintenance hole 12 is provided to the inclined road SL. Here, the external recognition sensor 11a into which components of the data acquisition section 102 that are the camera 201, the millimeter-wave radar 202, and the LiDAR 203 are incorporated, is provided to a front portion of the vehicle 11. It is assumed that, as illustrated in, for example, FIG. 6, the LiDAR 203 from among the external recognition sensor 11a that is the data acquisition section 102 emits pieces of laser light L1 to L13 to a region situated ahead in a traveling direction, and receives the respective pieces of reflected light to acquire three-dimensional group-of-points information as an object recognition result.

Here, FIG. 6 illustrates a state in which six pieces of laser light L3 to L8 from among the pieces of laser light L1 to L13 are irradiated onto the maintenance hole 12, and are received as pieces of reflected light.

Figure 7:
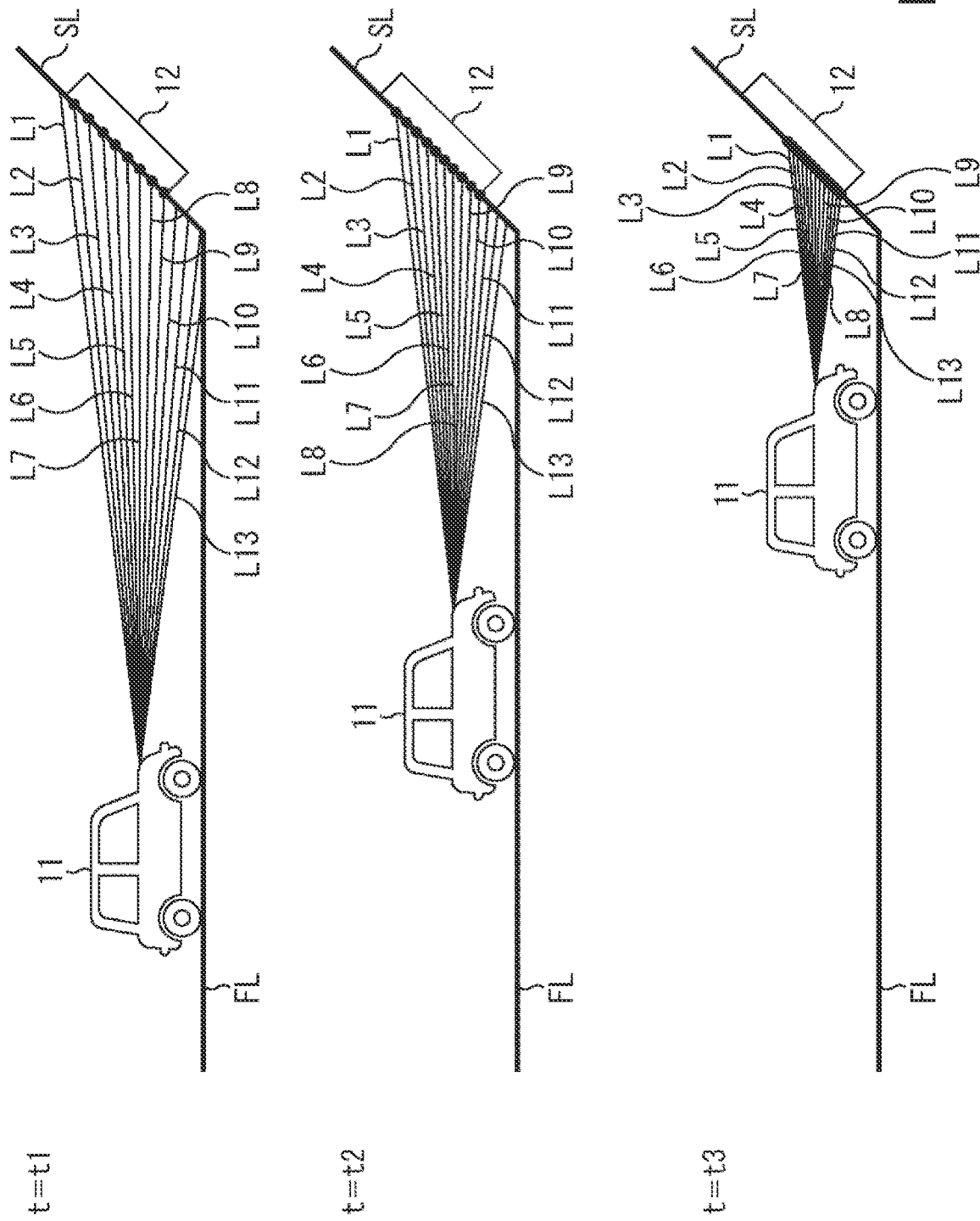
FIG. 7 is a diagram for describing the collision determination performed by the LiDAR.

When the vehicle 11 gets closer to the maintenance hole 12 on the inclined road SL in this state as time goes on, the number of pieces of laser light reflected off the maintenance hole 12 is gradually increased from an elapse time t1 to an elapse time t3, as illustrated in FIG. 7.

In other words, at the time t1 when a specified period of time has elapsed since the state of FIG. 6, eight pieces of laser light L2 to L9 from among the pieces of laser light L1 to L13 are irradiated onto the maintenance hole 12, and are received as pieces of reflected light by the LiDAR 203, as illustrated in an upper portion of FIG. 7.

Further, thereafter, at the time t2, ten pieces of laser light L1 to L10 from among the pieces of laser light L1 to L13 are irradiated onto the maintenance hole 12, and are received as pieces of reflected light by the LiDAR 203, as illustrated in an intermediate portion of FIG. 7.

Furthermore, thereafter, at the time t3, all of the thirteen pieces of laser light L1 to L13 are irradiated onto the maintenance hole 12, and are received as pieces of reflected light by the LiDAR 203, as illustrated in a lower portion of FIG. 7.

As described above, the number of pieces of laser light reflected off the maintenance hole 12 from among pieces of laser light irradiated by the LiDAR 203 provided as the external recognition sensor 11a of the vehicle 11, is chronologically increased as the vehicle 11 gets closer to the maintenance hole 12. Further, the magnitude of a time-series change in the number of the pieces of reflected laser light differs depending on an inclination of the surface of the maintenance hole 12. In other words, the chronologically changed number of pieces of laser light is larger if the inclination is greater, and the chronologically changed number of pieces of laser light is smaller if the inclination is smaller.

Thus, the collision determination section 223 obtains an inclination of the surface of an object on the basis of a time-series change in the number of pieces of laser light reflected off the object, and performs a collision determination on the basis of whether the size of the object is larger than a specified size and whether an inclination of the object is larger than a specified inclination.

<<4. Collision Determination Processing>>

Figure 8:
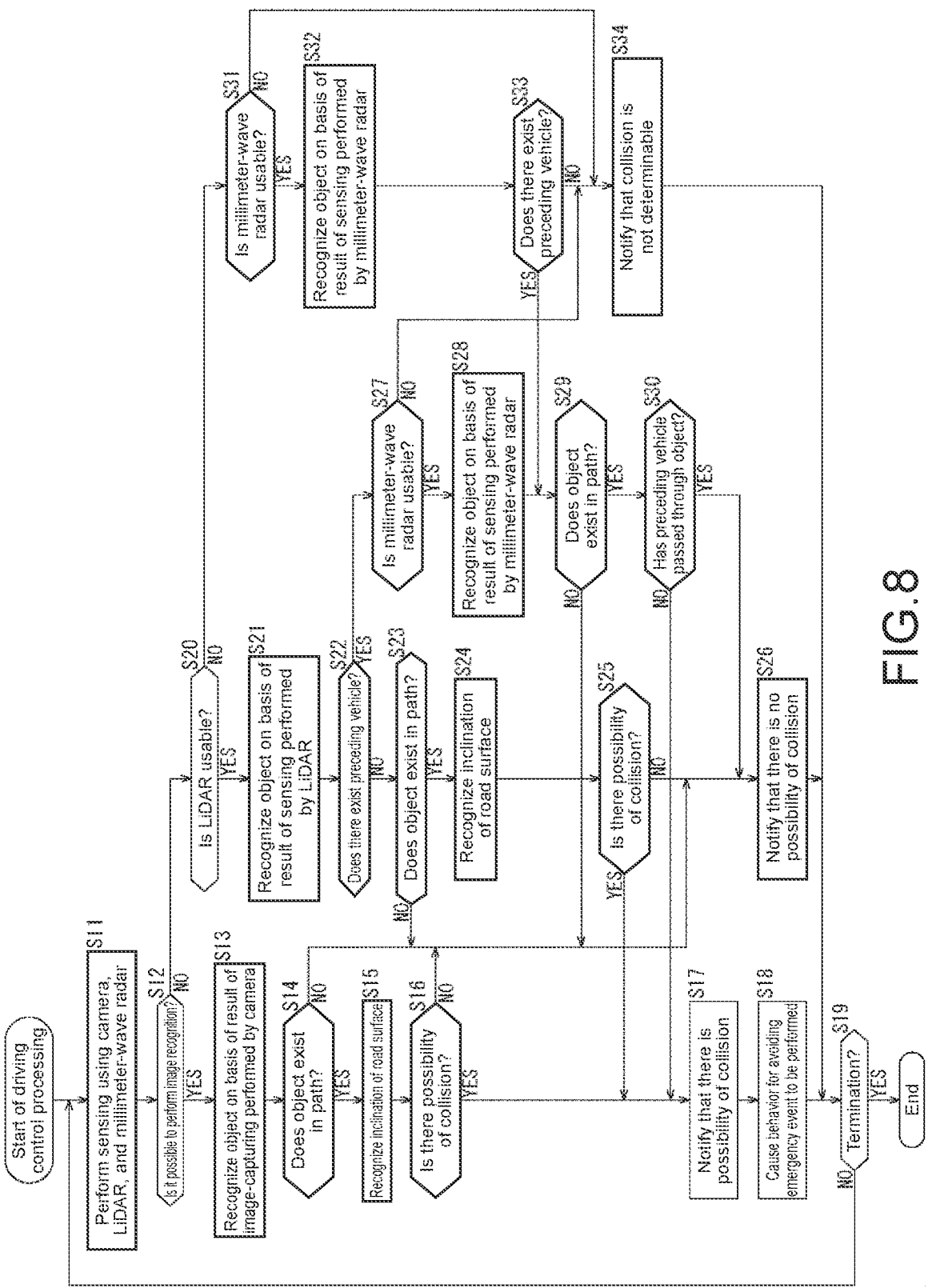
FIG. 8 is a flowchart illustrating driving control processing.

Next, collision determination processing performed by the vehicle 11 of the present disclosure is described with reference to a flowchart of FIG. 8.

In Step S11, the camera 201, the millimeter-wave radar 202, and the LiDAR 203 of the data acquisition section 102 output respective sensing results (a captured image with respect to the camera 201) to the detector 131 of the automated driving controller 112.

In Step S12, the object recognition section 221 determines whether it is possible to recognize an object on the basis of the image captured by the camera 201. More specifically, in consideration of being affected by the environment such as insufficient brightness at night, during rough weather, or the like, the object recognition section 221 determines whether it is possible to appropriately recognize an object on the basis of the image captured by the camera 201.

When it has been determined, in Step S12, that it is possible to recognize an object on the basis of the image captured by the camera 201, the process moves on to Step S13.

In Step S13, on the basis of the captured image that is the result of sensing performed by the camera 201, the object recognition section 221 recognizes an object for each pixel using, for example, semantic segmentation.

In Step S14, the collision determination section 223 determines whether an object that may be an obstacle exists in the path, on the basis of a result of the object recognition performed by the object recognition section 221 on the basis of the captured image that is the result of sensing performed by the camera 201.

For example, when it has been determined, in Step S14, that an object that may be an obstacle exists in the path, the process moves on to Step S15.

In Step S15, the inclination recognition section 222 recognizes an inclination of a region recognized as a road surface by the object recognition section 221.

In Step S16, on the basis of the inclination of the road surface and information regarding the object in the path that may be an obstacle, the collision determination section 223 determines whether there is a possibility of colliding with the object.

For example, in Step 16, when the object is, for example, a person or a parked vehicle that is large in size, or when the road surface is greatly inclined and there is a possibility that the object is a wall or a fence, it is determined that there is a possibility of colliding with the object, and the process moves on to Step S17.

In Step S17, the collision determination section 223 notifies the emergency event avoiding section 171 of the movement controller 135 that there is a possibility of the collision.

In Step S18, the emergency event avoiding section 171 controls the acceleration/deceleration controller 172 and the direction controller 173 on the basis of the notification from the collision determination section 223 to cause the drivetrain system 108 to be driven by the drivetrain controller 107 in order to avoid colliding with the object that may be an obstacle.

It is determined, in Step S19, whether an instruction to terminate the processing has been given. When it has been determined that the instruction to perform the termination has not been given, the process returns to Step S11, and the subsequent processes are repeated. When it has been determined, in Step S19, that the instruction to perform the termination has been given, the processing is terminated.

Further, when it has been determined, in Step S14, that the object that may be an obstacle does not exist in the path, or when it has been determined, in Step S16, that there is no possibility of the collision, the process moves on to Step S26.

In Step S26, the collision determination section 223 notifies the emergency event avoiding section 171 of the movement controller 135 that there is no possibility of the collision. Note that when there is no possibility of the collision, the notification to the emergency event avoiding section 171 is not indispensable. Thus, the process of Step S26 may be skipped or the process of Step S26 itself may be deleted as necessary.

Further, when it has been determined, in Step S12, that the object recognition based on the image is not successfully performed, the process moves on to Step S20.

In Step S20, the object recognition section 221 determines whether it is possible to recognize an object on the basis of the result of sensing performed by the LiDAR 203. More specifically, the LiDAR 203 is capable of performing sensing even under difficult conditions for capturing an image using the camera 201, such as an insufficient amount of light due to, for example, nighttime or rough weather. Thus, the object recognition section 221 determines whether it is possible to perform sensing without the occurrence of, for example, a malfunction in the LiDAR 203.

When it has been determined, in Step S20, that it is possible to recognize an object on the basis of the result of sensing performed by the LiDAR 203, the process moves on to Step S21.

In Step S21, the object recognition section 221 recognizes an object on the basis of the result of sensing performed by the LiDAR 203.

In Step S22, the collision determination section 223 determines whether there exists a preceding vehicle on the basis of a result of the object recognition performed on the basis of the result of sensing performed by the LiDAR 203. On the basis of the object recognition result, the collision determination section 223 determines that there exists a preceding vehicle when, for example, there exists an object that is situated ahead of the own automobile and of which a positional relationship with the own automobile remains unchanged in a specified state.

When it has been determined, in Step S22, that there exists no preceding vehicle, the process moves on to Step S23.

In Step S23, the collision determination section 223 determines whether an object that may be an obstacle exists in the path, on the basis of the result of the object recognition performed on the basis of the result of sensing performed by the LiDAR 203.

When it has been determined, in Step S23, that the object that may be an obstacle does not exist in the path, the process moves on to Step S24.

In Step S24, the inclination recognition section 222 recognizes an inclination of a road surface on the basis of the result of the object recognition performed on the basis of the result of sensing performed by the LiDAR 203.

In Step S25, on the basis of the result of the object recognition performed on the basis of the result of sensing performed by the LiDAR 203, and on the basis of the inclination of the road surface, the collision determination section 223 determines whether there is a possibility of colliding with the object on the basis of whether the object has a size larger than a specified size or whether the inclination is greater than a specified inclination.

When it has been determined, in Step S25, that there is a possibility of the collision, or when it has been determined, in Step S23, that the object that may be an obstacle does not exist in the path, the process moves on to Step S17, and notification that there is a possibility of collision is given.

When it has been determined, in Step S25, that there is no possibility of the collision, the process moves on to Step S26, and notification that there is no possibility of collision is given.

Further, when it has been determined, in Step S22, that there exists a preceding vehicle, the process moves on to Step S27.

In other words, in the case in which only a result of an object recognition performed on the basis of a result of sensing performed by the LiDAR 203, a preceding vehicle will be an obstacle when there exists the preceding vehicle, and thus an obstacle that may be situated further ahead of the preceding vehicle will not be successfully detected. Thus, when there exists a preceding vehicle, collision is not determinable as in the case of the occurrence of a malfunction in the LiDAR 203.

In Step S27, the object recognition section 221 determines whether it is possible to recognize an object on the basis of the result of sensing performed by the millimeter wave radar 202. More specifically, the millimeter-wave radar 202 is capable of performing sensing even under difficult conditions for capturing an image using the camera 201, such as an insufficient amount of light due to, for example, nighttime or rough weather. Thus, the object recognition section 221 determines whether it is possible to perform sensing without the occurrence of, for example, a malfunction in the millimeter-wave radar 202.

When it has been determined, in Step S27, that it is possible to recognize an object on the basis of the result of sensing performed by the millimeter-wave radar 202, the process moves on to Step S28.

In Step S28, the object recognition section 221 recognizes an object on the basis of the result of sensing performed by the millimeter-wave radar 202.

In Step S29, the collision determination section 223 determines whether an object that may be an obstacle exists in the path, on the basis of the result of the object recognition performed on the basis of the result of sensing performed by the millimeter-wave radar 202.

When it has been determined, in Step S29, that the object that may be an obstacle does not exist in the path, the process moves on to Step S26, and notification that there is no possibility of collision is given.

On the other hand, when it has been determined, in Step S29, that the object that may be an obstacle exists in the path, the process moves on to Step S30.

In Step S30, the collision determination section 223 determines whether the preceding vehicle has passed through a location at which there is the object that may be an obstacle.

When it has been determined, in Step S30, that the preceding vehicle has passed through the location at which there is the object that may be an obstacle, the process moves on to Step S26, and notification that there is no possibility of collision is given.

Further, when it has been determined, in Step S30, that, for example, the preceding vehicle has passed while avoiding the location of the object that may be an obstacle, the process moves on to Step S17, and notification that there is a possibility of collision is given.

In other words, in this case, it is determined that the preceding vehicle has recognized the object as an obstacle and has passed while avoiding the object in order to avoid colliding with the object. Thus, it is determined that there is a possibility of colliding with the detected object.

When it has been determined, in Step S20, that an object is not successfully recognized on the basis of the result of sensing performed by the LiDAR 23, the process moves on to Step S31.

In Step S31, the object recognition section 221 determines whether it is possible to recognize an object on the basis of the result of sensing performed by the millimeter-wave radar 202.

When it has been determined, in Step S31, that it is possible to recognize an object on the basis of the result of sensing performed by the millimeter-wave radar 202, the process moves on to Step S32.

In Step S32, the object recognition section 221 recognizes an object on the basis of the result of sensing performed by the millimeter-wave radar 202.

In Step S33, the collision determination section 223 determines whether there exists a preceding vehicle on the basis of a result of the object recognition performed on the basis of the result of sensing performed by the millimeter-wave radar 202.

When it has been determined, in Step S33, that there exists a preceding vehicle, the process moves on to Step S29. It is determined whether an object that may be an obstacle exists in the path, and a collision determination is performed on the basis of whether the preceding vehicle has passed through the location of the object.

On the other hand, when it has been determined, in Step S33, that there exists on preceding vehicle, or when it has been determined, in Step S31, that an object is not successfully recognized on the basis of the result of the object recognition performed on the basis of the result of sensing performed by the millimeter-wave radar 202, the process moves on to Step S34.

In Step S34, the collision determination section 223 outputs information indicating that collision is not determinable. In other words, notification that collision is not deterrninable on the basis of a result of an object recognition performed on the basis of an image captured by the camera 201, a result of an object recognition performed on the basis of a result of sensing performed by the millimeter-wave radar 202, or a result of an object recognition performed on the basis of a result of sensing performed by the LiDAR 203, is given.

In the processing described above, when it is bright, for example, in fine weather, a collision determination is performed on the basis of a result of sensing performed by the camera 201 (a captured image). This makes it possible to perform an accurate collision determination on the basis of a result of an accurate object recognition performed using an image.

Further, when an object recognition is not successfully performed on the basis of an image, that is, when it is during rough weather, at night, or the like, and when there exists no preceding vehicle, a collision determination is performed on the basis of a result of sensing performed by the LiDAR.

Furthermore, when an object recognition is not successfully performed on the basis of an image, that is, when it is during rough weather, at night, or the like, and when there exists a preceding vehicle, a collision determination is performed on the basis of a result of sensing performed by the millimeter-wave radar, and on the basis of whether the preceding vehicle has passed through a location of a detected object.

Accordingly, it is possible to perform a collision determination even in a state in which collision is not determinable on the basis of an image, regardless of the presence or absence of a preceding vehicle.

Consequently, it is possible to perform an appropriate collision determination in any of those cases without being affected by a change in environment.

<<5. Example of Performing Series of Processes Using Software>

Note that the series of processes described above can be performed using hardware or software. When the series of processes is performed using software, a program included in the software is installed on a computer from a recording medium. Examples of the computer include a computer incorporated into dedicated hardware, and a computer such as a general-purpose computer that is capable of performing various functions by various programs being installed thereon.

Figure 9:
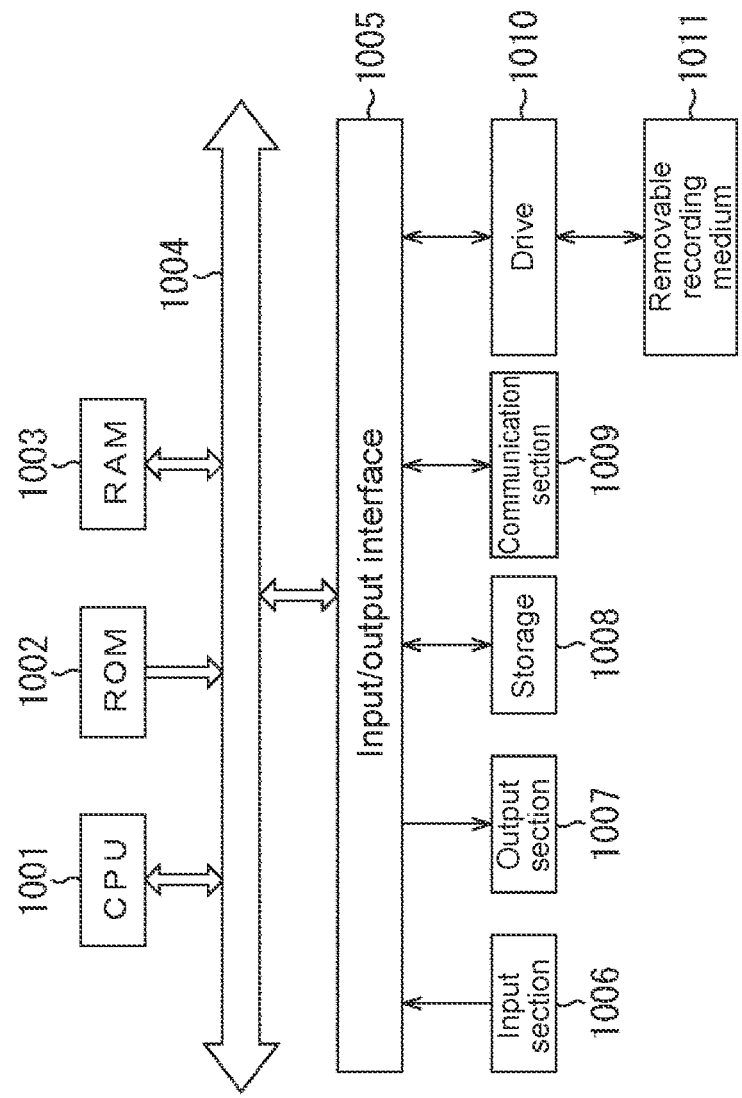
FIG. 9 illustrates an example of a configuration of a general-purpose computer.

FIG. 9 illustrates an example of a configuration of a general-purpose computer. This computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

An input section 1006, an output section 1007, a storage 1008, and a communication section 1009 are connected to the input/output interface 1005. The input section 1006 includes input devices such as a keyboard and a mouse that are used by a user to input an operation command. The output section 1007 outputs a processing operation screen and an image of a processing result to a display device. The storage 1008 includes, for example, a hard disk drive that stores therein a program and various data. The communication section 1009 includes, for example, a local area network (LAN) adapter, and performs communication processing through a network as represented by the Internet. Further, a drive 1010 is connected to the input/output interface 1005. The drive 1010 reads data from and writes data into a removable recording medium 1011 such as a magnetic disk (including a flexible disk), an optical disk (including a compact disc read-only memory (CD-ROM) and a digital versatile disc (DVD)), a magneto-optical disk (including a mini disc (MD)), or a semiconductor memory.

The CPU 1001 performs various processes in accordance with a program stored in a ROM 1002, or in accordance with a program that is read from the removable recording medium 1011 such as a magnetic disk, an optical disk, a magneto-optical disk, or a semiconductor memory to be installed on the storage 1008, and is loaded into a RAM 1003 from the storage 1008. Data necessary for the CPU 1001 to perform various processes is also stored in the RAM 1003 as necessary.

In the computer having the configuration described above, the series of processes described above is performed by the CPU 1001 loading, for example, a program stored in the storage 1008 into the RAM 1003 and executing the program via the input/output interface 1005 and the bus 1004.

For example, the program executed by the computer (the CPU 1001) can be provided by being stored in the removable recording medium 1011 serving as, for example, a package medium. Further, the program can be provided via a wired or wireless transmission medium such as a local area network, the Internet, or digital satellite broadcasting.

In the computer, the program can be installed on the storage 1008 via the input/output interface 1005 by the removable recording medium 1011 being mounted on the drive 1010. Further, the program can be received by the communication section 1009 via the wired or wireless transmission medium to be installed on the storage 1008. Moreover, the program can be installed in advance on the ROM 1002 or the storage 1008.

Note that the program executed by the computer may be a program in which processes are chronologically performed in the order of the description herein, or may be a program in which processes are performed in parallel or a process is performed at a necessary timing such as a timing of calling.

Note that the function of the automated driving controller 112 of FIG. 4 is implemented by the CPU 1001 of FIG. 9. Further, the storage 111 of FIG. 4 is implemented by the storage 1008 of FIG. 9.

Further, the system as used herein refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both systems.

Note that the embodiment of the present disclosure is not limited to the examples described above, and various modifications may be made thereto without departing from the scope of the present disclosure.

For example, the present disclosure may also have a configuration of cloud computing in which a single function is shared to be cooperatively processed by a plurality of apparatuses via a network.

Further, the respective steps described using the flowcharts described above may be shared to be performed by a plurality of apparatuses, in addition to being performed by a single apparatus.

Moreover, when a single step includes a plurality of processes, the plurality of processes included in the single step may be shared to be performed by a plurality of apparatuses, in addition to being performed by a single apparatus.

Note that the present disclosure may also take the following configurations.

<1> An information processing apparatus, including:

an objection recognition section that recognizes an object situated ahead of a vehicle using a plurality of recognition methods, and outputs results of the object recognitions respectively performed using the plurality of recognition methods; and a collision determination section that selects the result of the object recognition depending on an environment around the vehicle from the results of the object recognitions respectively performed using the plurality of recognition methods, and determines whether there is a possibility of colliding with the object, on the basis of the selected result of the object recognition.

<2> The information processing apparatus according to <1>, further including:

a camera that captures an image of a region situated ahead of the vehicle;

a millimeter-wave radar that irradiates radio waves in a millimeter-wave band onto the region situated ahead, and detects the waves reflected off the object; and LiDAR that irradiates laser light onto the region situated ahead of the vehicle, and detects the light reflected off the object, in which the object recognition section outputs a result of an image-use object recognition performed on the basis of the image captured by the camera, a result of a millimeter-wave-radar-use object recognition performed on the basis of a result of detection performed by the millimeter-wave radar, and a result of a LiDAR-use object recognition performed on the basis of a result of detection performed by the LiDAR.

<3> The information processing apparatus according to <2>, in which when an object recognition is successfully performed on the basis of the result of the image-use object recognition depending on the environment around the vehicle, the collision determination section determines whether there is a possibility of colliding with the object, on the basis of the result of the image-use object recognition.

<4> The information processing apparatus according to <2> or <3>, further including an inclination recognition section that recognizes an inclination of a road surface situated ahead of the vehicle on the basis of the result of the image-use object recognition, in which the collision determination section determines whether there is a possibility of colliding with the object, on the basis of the result of the image-use object recognition and the inclination of the road surface.

<5> The information processing apparatus according to <4>, in which the inclination recognition section recognizes the inclination of the road surface situated ahead of the vehicle, on the basis of a time-series change in the number of the pieces of reflected light detected by the LiDAR, the time-series change occurring with a time-series change in a distance between the vehicle and the object.

<6> The information processing apparatus according to any one of <2> to <5>, in which when an object recognition is not successfully performed on the basis of the result of the image-use object recognition depending on the environment around the vehicle, the collision determination section determines whether there is a possibility of colliding with the object, on the basis of the result of the millimeter-wave-radar-use object recognition or the result of the LiDAR-use object recognition.

<7> The information processing apparatus according to <6>, in which when the object recognition is not successfully performed on the basis of the result of the image-use object recognition depending on the environment around the vehicle, and when an object recognition is successfully performed on the basis of the result of the LiDAR-use object recognition, the collision determination section determines whether there is a possibility of colliding with the object, on the basis of the result of the LiDAR-use object recognition.

<8> The information processing apparatus according to <7>, in which when a preceding vehicle is not recognized as being present on the basis of the result of the LiDAR-use object recognition, the object recognition based on the result of the LiDAR-use object recognition is determined to be successfully performed, and the collision determination section determines whether there is a possibility of colliding with the object, on the basis of the result of the LiDAR-use object recognition.

<9> The information processing apparatus according to <8>, in which when the preceding vehicle is recognized as being present on the basis of the result of the LiDAR-use object recognition, the object recognition based on the result of the LiDAR-use object recognition is determined to not be successfully performed, and the collision determination section determines whether there is a possibility of colliding with the object, on the basis of the result of the millimeter-wave-radar-use object recognition.

<10> The information processing apparatus according to <9>, in which the collision determination section determines whether there is a possibility of colliding with the object, on the basis of the result of the millimeter-wave-radar-use object recognition, and on the basis of whether the preceding vehicle has passed through a location at which the object has been recognized.

<11> The information processing apparatus according to <6>, in which when an object recognition is not successfully performed on the basis of the result of the LiDAR-use object recognition, the collision determination section determines whether there is a possibility of colliding with the object, on the basis of the result of the millimeter-wave-radar-use object recognition.

<12> The information processing apparatus according to <11>, in which when the preceding vehicle is recognized as being present on the basis of the result of the millimeter-wave-radar-use object recognition, the collision determination section determines whether there is a possibility of colliding with the object, on the basis of the result of the millimeter-wave-radar-use object recognition.

<13> The information processing apparatus according to <12>, in which the collision determination section determines whether there is a possibility of colliding with the object, on the basis of the result of the millimeter-wave-radar-use object recognition, and on the basis of whether the preceding vehicle has passed through a location at which the object has been recognized.

<14> The information processing apparatus according to <2>, in which when an object recognition based on the result of the image-use object recognition is not successfully performed depending on the environment around the vehicle, and when neither an object recognition based on the result of the millimeter-wave-radar-use object recognition, nor an object recognition based on the result of the LiDAR-use object recognition is successfully performed, the collision determination section outputs information indicating that determination of whether there is a possibility of colliding with the object is not successfully performed.

<15> An information processing method, including:

performing objection recognition processing that includes recognizing an object situated ahead of a vehicle using a plurality of recognition methods, and outputting results of the object recognitions respectively performed using the plurality of recognition methods; and performing collision determination processing that includes selecting the result of the object recognition depending on an environment around the vehicle from the results of the object recognitions respectively performed using the plurality of recognition methods, and determining whether there is a possibility of colliding with the object, on the basis of the selected result of the object recognition.

<16> A program that causes a computer to operate as an objection recognition section and a collision determination section, the objection recognition section recognizing an object situated ahead of a vehicle using a plurality of recognition methods, the objection recognition section outputting results of the object recognitions respectively performed using the plurality of recognition methods, the collision determination section selecting the result of the object recognition depending on an environment around the vehicle from the results of the object recognitions respectively performed using the plurality of recognition methods, the collision determination section determining whether there is a possibility of colliding with the object, on the basis of the selected result of the object recognition.

REFERENCE SIGNS LIST

11 vehicle
100 vehicle control system
102 data acquisition section
112 automated driving controller
133 state analyzer
134 planning section
135 movement controller
153 state recognition section
154 state prediction section
172 acceleration/deceleration controller
173 direction controller
201 camera
202 millimeter-wave radar
203 LiDAR
221 object recognition section
222 inclination recognition section
223 collision determination section

The invention claimed is:

1. An information processing apparatus, comprising:
a camera that captures an image of a region situated ahead of a vehicle;
a millimeter-wave radar that irradiates radio waves in a millimeter-wave band onto the region situated ahead, and detects the waves reflected off an object;
LiDAR that irradiates laser light onto the region situated ahead of the vehicle, and detects the light reflected off the object;
an object recognition section that
recognizes the object situated ahead of the vehicle using a plurality of recognition methods,
outputs results of the object recognitions respectively performed using the plurality of recognition methods, and
outputs a result of an image-use object recognition performed based on the image captured by the camera, a result of a millimeter-wave-radar-use object recognition performed based on a result of detection performed by the millimeter-wave radar, and a result of a LiDAR-use object recognition performed based on a result of detection performed by the LiDAR; and
a collision determination section that selects the result of the object recognition depending on an environment around the vehicle from the results of the object recognitions respectively performed using the plurality of recognition methods, and determines whether there is a possibility of colliding with the object, based on the selected result of the object recognition, wherein when the object recognition is not successfully performed based on the result of the image-use object recognition depending on the environment around the vehicle, the collision determination section determines whether there is a possibility of colliding with the object, based on the result of the millimeter-wave-radar-use object recognition or the result of the LiDAR-use object recognition.

2. The information processing apparatus according to claim 1, wherein
when an object recognition is successfully performed based the result of the image-use object recognition depending on the environment around the vehicle, the collision determination section determines whether there is a possibility of colliding with the object, based on the result of the image-use object recognition.

3. The information processing apparatus according to claim 1, further comprising
an inclination recognition section that recognizes an inclination of a road surface situated ahead of the vehicle based on the result of the image-use object recognition, wherein
the collision determination section determines whether there is a possibility of colliding with the object, based on the result of the image-use object recognition and the inclination of the road surface.

4. The information processing apparatus according to claim 3, wherein
the inclination recognition section recognizes the inclination of the road surface situated ahead of the vehicle, based on a time-series change in a number of pieces of reflected light detected by the LiDAR, the time-series change occurring with a time-series change in a distance between the vehicle and the object.

5. The information processing apparatus according to claim 1, wherein
when the object recognition is not successfully performed based on the result of the image-use object recognition depending on the environment around the vehicle, and when an object recognition is successfully performed based on the result of the LiDAR-use object recognition, the collision determination section determines whether there is a possibility of colliding with the object, based on the result of the LiDAR-use object recognition.

6. The information processing apparatus according to claim 5, wherein
when a preceding vehicle is not recognized as being present based on the result of the LiDAR-use object recognition, the object recognition based on the result of the LiDAR-use object recognition is determined to be successfully performed, and the collision determination section determines whether there is a possibility of colliding with the object, based on the result of the LiDAR-use object recognition.

7. The information processing apparatus according to claim 6, wherein
when the preceding vehicle is recognized as being present based on the result of the LiDAR-use object recognition, the object recognition based on the result of the LiDAR-use object recognition is determined to not be successfully performed, and the collision determination section determines whether there is a possibility of colliding with the object, based on the result of the millimeter-wave-radar-use object recognition.

8. The information processing apparatus according to claim 7, wherein
the collision determination section determines whether there is a possibility of colliding with the object, based on the result of the millimeter-wave-radar-use object recognition, and based on whether the preceding vehicle has passed through a location at which the object has been recognized.

9. The information processing apparatus according to claim 1, wherein
when an object recognition is not successfully performed based on the result of the LiDAR-use object recognition, the collision determination section determines whether there is a possibility of colliding with the object, based on the result of the millimeter-wave-radar-use object recognition.

10. The information processing apparatus according to claim 8, wherein
when the preceding vehicle is recognized as being present based on the result of the millimeter-wave-radar-use object recognition, the collision determination section determines whether there is a possibility of colliding with the object, based on the result of the millimeter-wave-radar-use object recognition.

11. The information processing apparatus according to claim 10, wherein
the collision determination section determines whether there is a possibility of colliding with the object, based on the result of the millimeter-wave-radar-use object recognition, and based on whether the preceding vehicle has passed through a location at which the object has been recognized.

12. The information processing apparatus according to claim 1, wherein when
an object recognition based on the result of the image-use object recognition is not successfully performed depending on the environment around the vehicle, an object recognition based on the result of the millimeter-wave-radar-use object recognition is not successfully performed, and an object recognition based on the result of the LiDAR-use object recognition is not successfully performed, in that order,
the collision determination section outputs information indicating that determination of whether there is a possibility of colliding with the object is not successfully performed.

13. An information processing method, comprising:
capturing, by a camera, an image of a region situated ahead of a vehicle;
performing irradiation of radio waves, by a millimeter-wave radar, in a millimeter-wave band onto the region situated ahead, and detects the waves reflected off an object;
performing irradiation of laser light, by LiDAR, onto the region situated ahead of the vehicle, and detects the light reflected off the object;
performing object recognition processing that includes recognizing the object situated ahead of the vehicle using a plurality of recognition methods;
outputting results of the object recognitions respectively performed using the plurality of recognition methods;
outputting a result of an image-use object recognition performed based on the image captured by the camera, a result of a millimeter-wave-radar-use object recognition performed based on a result of detection performed by the millimeter-wave radar, and a result of a LiDAR-use object recognition performed based on a result of detection performed by the LiDAR;

performing collision determination processing that includes selecting the result of the object recognition depending on an environment around the vehicle from the results of the object recognitions respectively performed using the plurality of recognition methods; and determining whether there is a possibility of colliding with the object, based on the selected result of the object recognition, wherein when the object recognition is not successfully performed based on the result of the image-use object recognition depending on the environment around the vehicle, and determining whether there is a possibility of colliding with the object, based on the result of the millimeter-wave-radar-use object recognition or the result of the LiDAR-use object recognition.

14. A non-transitory computer-readable medium having stored thereon computer-executable instructions that, when executed by a processor, cause the processor to execute operations, the operations comprising:

capturing, by a camera, an image of a region situated ahead of a vehicle;

performing irradiation of radio waves, by a millimeter-wave radar, in a millimeter-wave band onto the region situated ahead, and detects the waves reflected off an object;

performing irradiation of laser light, by LiDAR, onto the region situated ahead of the vehicle, and detects the light reflected off the object;

performing object recognition processing that includes recognizing the object situated ahead of the vehicle using a plurality of recognition methods;

outputting results of the object recognitions respectively performed using the plurality of recognition methods;

outputting a result of an image-use object recognition performed based on the image captured by the camera, a result of a millimeter-wave-radar-use object recognition performed based on a result of detection performed by the millimeter-wave radar, and a result of a LiDAR-use object recognition performed based on a result of detection performed by the LiDAR;

performing collision determination processing that includes selecting the result of the object recognition depending on an environment around the vehicle from the results of the object recognitions respectively performed using the plurality of recognition methods; and determining whether there is a possibility of colliding with the object, based on the selected result of the object recognition, wherein when the object recognition is not successfully performed based on the result of the image-use object recognition depending on the environment around the vehicle, and determining whether there is a possibility of colliding with the object, based on the result of the millimeter-wave-radar-use object recognition or the result of the LiDAR-use object recognition.

* * * * *